United States Patent [19]
Tidwell et al.

[11] 3,723,564
[45] Mar. 27, 1973

[54] ISOMERIZATION OF BUTENE-1 TO CIS-BUTENE-2

[75] Inventors: Calvin M. Tidwell; Val G. Henneberg, both of Houston, Tex.

[73] Assignee: Petro-Tex Chemical Corporation, Houston, Tex.

[22] Filed: Nov. 24, 1969

[21] Appl. No.: 879,581

[52] U.S. Cl..............................260/683.2, 260/448 C
[51] Int. Cl................................................C07c 5/30
[58] Field of Search ....260/448 C, 683.2; 208/46 MS

[56] References Cited

UNITED STATES PATENTS

| | | | |
|---|---|---|---|
| 3,475,511 | 10/1969 | Manning | 260/683.2 |
| 3,467,727 | 9/1969 | Kahn | 260/683.2 |
| 3,409,699 | 11/1968 | Mitsche | 260/683.2 |

*Primary Examiner*—Delbert E. Gantz
*Assistant Examiner*—Veronica O'Keefe
*Attorney*—G. Baxter Dunaway

[57] ABSTRACT

Butene-1 is isomerized principally to cis-butene-2 by contacting butene-1 in liquid phase with a molecular sieve having an effective pore size of greater than 5 and less than 10 A. at e.g. 100°C. Prior to use the molecular sieve was activated at a temperature of 400°–450°C. in a stream of nitrogen and 3 percent oxygen. Conversion to butene-2 was 32 mole percent of which 51.3 percent was the cis form. The cis-butene-2 is a useful feed for oxidative dehydrogenation to butadiene.

10 Claims, No Drawings

ISOMERIZATION OF BUTENE-1 TO CIS-BUTENE-2

The present invention relates to a process of isomerization of butene-1 to butene-2 using a pretreated molecular sieve catalyst.

Butene-2 is the preferred feed for the preparation of butadiene, particularly butadiene-1,3, by oxidative dehydrogenation, for example, as shown in the U.S. Pat. Nos. 3,260,767; 3,274,285; 3,284,536; 3,303,234–7 and 3,320,329. A great deal of investigation has been carried out on isomerization of butene-1 over various catalysts including some investigations in regard to molecular sieves. However, past efforts using molecular sieves have been generally disappointing, producing conversions of less than 5 percent to butene-2. According to the present invention much higher conversions are achieved. Another salient feature of the present isomerization is the production of a predominate amount of the cis-butene-2. In the majority of processes for the isomerization of butene-1 to butene-2, the trans isomer is the predominant isomer formed.

Cis-butene-2 is a useful feed for oxidative dehydrogenation and has been observed to be somewhat more active therein than the trans form.

Briefly stated, the present invention is a process for isomerizing butene-1 to butene-2 comprising contacting a feed containing butene-1 in liquid phase with a molecular sieve having an effective pore size of greater than 5 and less than 10 A. said molecular sieve having been activated prior to said contacting by heating at a temperature of at least 300°C. characterized in that said butene-2 is predominately in the cis form.

The central feature of the present invention is the use of a molecular sieve catalyst. Molecular sieves are porous crystalline, three-dimensional metal aluminasilicates of the zeolite mineral group. The crystal skeleton is composed of silicon and aluminum atoms each surrounded by four oxygen atoms to form a small pyramid of tetrahedron (tetrahedral coordination). The term molecular sieve can be applied to both naturally occurring zeolites and synthetic zeolites. Naturally occurring zeolites have irregular pore size and are not generally considered as equivalent to synthetic zeolites. In the present invention, however, naturally occurring zeolites are acceptable so long as they are substantially pure and have substantially all of their pores of greater than about 5 and less than about 10 Angstroms size. The balance of the present discussion shall be directed to the synthetic zeolites with the understanding that natural zeolites are considered equivalent thereto as indicated above, i.e., in so far as the natural zeolites are the functional equivalents of the synthetic zeolites.

Usually synthetic zeolites are prepared in the sodium form, that is, with a sodium cation in close proximity to each aluminum tetrahedron and balancing its charge. To date four principal types of molecular sieves have been reported, A, X, Y, and L. The A type have relatively small pore size. By the term pore size is meant the effective pore size (diameter) rather than the free pore size (diameter). Type 5A having an effective pore size of approximately 5 A (free diameter 4.2 A) has not been found suitable for the present process. Types X and Y have larger pore size (up to approximately 10 A) and differ as to the range of ratio of $AlO_4$ to $SiO_4$ as:

Type X $NaO \cdot Al_2O_3 \cdot 2.0$–$3.0 \, SiO_2$
Type Y $NaO \cdot Al_2O_3 \cdot 3.0$–$6.0 \, SiO_2$ Type L has still higher ratios of $SiO_2$ to $Al_2O_3$.

The pore size within the crystal lattice is important to the present reaction. According to one theory of molecular sieve catalytic activity, zeolite catalysis occurs primarily inside the uniform crystal cavities, consequently zeolitic catalyst activity depends on the number of aluminum atoms in the crystal and thus on the chemical composition of the crystal. Moreover, these catalytic sites are fixed within the rigid structure of the crystal, so that access to sites can be altered by altering the structure of the crystal. It has been found that molecular sieves suitable for the present invention must have an effective pore size of greater than about 5 A and less than about 10 A, prefereably a molecular sieve having an effective pore size of about 8 A is employed and more preferably an X type. The effective pore size reflects the size of the molecules that can pass through the sieve. It has been observed that the elasticity and kinetic energy of the incoming molecules, generally, allows easy passage of molecules up to 0.5 Angstroms larger than the free diameter of the aperature.

The molecular sieve employed according to this invention is activated by heating the molecular sieve at a temperature at least 300°C. and more preferably at about 320° – 500°C. Generally the heating is continued for ½ to 5 hours. The heating can be carried out in air or other non-reactive gases such as nitrogen, helium, argon or various mixtures thereof. Preferably there is some oxygen present in the non-reactive gas. In a similar manner a a used catalyst can be regenerated by heating as indicated in a non-reactive atmosphere. Thus, a cyclic process of alternating cycles of reaction and regeneration - activation is possible. In the succeeding regeneration - activation cycles care should be taken not to allow the temperature in the molecular sieve bed to go beyond the point at which the molecular sieve is destroyed, i.e., about 600°C. It has been found that in the regenerations the molecular sieve must be heated to at least 400°C. If not, there is no regeneration and activation. Thus, the regeneration and activation temperature of 400° – 600°C. is critical. One means of controlling the temperature during the regeneration - activation is to maintain control over the oxygen that is used to burn off the accumulated residue on the catalyst. This is quite simply done by maintaining a small volume, e.g., 1 – 10 percent oxygen in the stream of non-reactive gas. The term non-reactive gas is used here to indicate a gas that does not react with, or react in regard to the molecular sieve, i.e., does not use up the catalyst. In this sense then oxygen, which reacts to burn off any accumulated residue on the catalyst is "non-reactive."

The isomerization reaction will proceed at relatively low temperatures, i.e., around 25°C. but it has been found that the yield of butene-2 is increased by using elevated temperatures for example 50° to 150°C. The reaction is conducted in liquid phase and the pressure is adjusted to maintain the reactants in a substantially liquid condition. This will generally require pressures of greater than 1 atmosphere to 50 or more atmospheres. The rate of feed to the reactor can vary over a wide range but will generally have a liquid hourly space velocity (LHSV) of from 5 to 15 (stated as reciprocal hours).

The feed to the reaction can be a relatively pure butene-1, however, this is not necessary. The butene-1 can be a minor constituent of a stream containing for example principally $C_4$, preferably, however, the feed will contain at least 10 mole percent butene-1. The stream can contain other hydrocarbons, e.g., methane, ethane, propane, pentane, hexane, heptane, ethylene, propylene, butadiene and the like, however, many of the other hydrocarbon constituents of the stream may also undergo various reactions such as isomerization, disproportionation, polymerization, etc. A particularly useful feed would be one comprising 40 to 60 mole percent butene-1, 6 to 10 mole percent n-butane, 0 to 4 mole percent isobutylene, and 30 to 50 mole percent butene-2. In a preferred embodiment of this invention the quantity of butadiene is limited to less than 3 percent preferably 0 – 3 percent. Although butadiene does not have any effect on the isomerization it does have a tendency to polymerize on the molecular sieve, thus, clogging the pores and limiting the throughput between regenerations.

When the isomerization is practiced according to this invention the yield of butene-2 is substantially increased, i.e., 2 and 3 times the yield without prior activation of the molecular sieve catalyst. Two forms of butene-2 are possible, the trans and the cis. Surprisingly, the present isomerization yields predominately the more active cis form whereas prior isomerizations yielded principally the trans form. The term "predominately" is used herein and in the claims to indicate an amount over 50 percent. Unless otherwise specified the percentages used herein are mole percents. The following examples will further illustrate the invention. Identification of feed and product constituents are made by gas - liquid chromatography.

EXAMPLE

The reactions described below were carried out in an apparatus which had a feed system comprising a reservoir and a calibrated variable stroke positive displacement pump connected to the reactor system. The reactor system consisted of two jacketed stainless steel reactors each containing a pressure relief valve set at 300 p.s.i.g. to maintain the feed streams in liquid phase.

Reactor 1 had an internal volume of 67 ml. and could be operated at temperatures up to 115°C. Reactor 2 had an internal volume of 500 ml. In operation, it was filled with 200 ml. of 4 – 8 mesh quartz chips, followed by 300 ml. of the test molecular sieve. Reactor 2 was equipped with electrical heaters and could be operated at temperatures up to 450°C. It was also equipped with a by-pass valving system and flow meters so that it could be regenerated with air-nitrogen mixtures and vapor or liquid preloaded with an inert hydrocarbon such as n-butane. The reactors were connected to an effluent system comprising an expansion section where the effluent was vaporized and brought to ambient temperature (about 25° C.), a knock-out pot to collect any non-volatile products, and a wet test meter to measure the effluent gas volume. The off gas was analyzed at frequent intervals and the effluent volumes calculated. The results of the analyses of feed and product are shown in the Table.

Run 1. Reactor 1 was charged with Type 5A molecular sieve (effective pore size less than 5 A, i.e., about 4.7 A) which had been activated in air at 320°C. The run was carried out at room temperature (about 25° C.) and 12.0 LHSV.

Run 2. Reactor 1 was charged with 10X molecular sieve (effective pore size of about 8 A) which was pretreated in air at 320°C. and run at about 25°C., LHSV 12.0.

Run 3. Same as Run 2 but run at 100°C., LHSV 12.0

Run 4. Reactor 1 was charged with Type 13X molecular sieve (effective pore size about 10 A) which was pretreated at 320° C. in air and run at 100° C., and LHSV 12.0.

Run 5. Reactor 2 was charged with Type 10X molecular sieve which had been activated at 320°C. in air. The reactor was preloaded with liquid n-butane and the run carried out at 100°C. at LHSV of 6.4.

Run 6. The charge of run 5 was regenerated in situ at 400° – 450°C. for 3 hours in a stream of 3 percent oxygen in nitrogen and cooled to room temperature (about 25° C.) in nitrogen only and preloaded and run as in Run 5.

Run 7. The charge of Run 6 was exhausted and regenerated for 4 additional cycles. Preloading and run conditions were the same for each cycle.

| Run No. | | Feed – Product Volume, ml. Liquid | | | | | | Isomerization of Butene – 1% * | |
|---|---|---|---|---|---|---|---|---|---|
| | n-Butane | Butene-1 | trans Butene-2 | cis Butene-2 | Butadiene | Isobutylene | Heavy Oils | to trans Butene-2 | to cis Butene-2 |
| 1 Feed | 88 | 446 | 269 | 18 | 6 | 2 | | | |
| Product | 85 | 439 | 278 | 20 | 5 | 2 | 0 | | |
| Net change | – 3 | – 7 | + 9 | + 2 | – 1 | 0 | 0 | + 79.5 | + 20.5 |
| 2 Feed | 89 | 452 | 272 | 18 | 6 | 2 | | | |
| Product | 85 | 429 | 254 | 40 | 1 | 0 | 29 | | |
| Net change | – 4 | – 23 | – 18 | + 22 | – 5 | – 2 | + 29 | .................. | 95.7 |
| 3 Feed | 459 | 2338 | 1408 | 92 | 29 | 11 | | | |
| Product | 451 | 2185 | 1354 | 289 | 6 | 2 | 63 | | |
| Net change | – 8 | – 153 | – 54 | + 197 | – 23 | – 9 | + 63 | .................. | 128.8 |
| 4 Feed | 103 | 567 | 301 | 19 | 7 | 3 | | | |
| Product | 103 | 566 | 303 | 19 | 7 | 3 | 0 | | |
| Net change | 0 | – 1 | + 2 | 0 | 0 | 0 | 0 | 0 | 0 |
| 5 Feed | ** | 6428 | 2571 | 97 | 21 | 343 | 0 | | |
| Product | .................. | 5751 | 2695 | 561 | 0 | 34 | 174 | | |
| Net change | | – 677 | + 124 | + 464 | – 21 | – 309 | + 74 | 18.4 | 68.6 |
| 6 Feed | .................. | 5477 | 2191 | 83 | 18 | 292 | | | |
| Product | .................. | 3734 | 2538 | 978 | 0 | 25 | 547 | | |
| Net change | | – 1743 | + 347 | + 895 | – 18 | – 267 | + 547 | 19.9 | 51.3 |
| 7 Feed | .................. | 10955 | 4381 | 165 | 36 | 584 | 0 | | |
| Product | .................. | 8534 | 4955 | 1705 | 1 | 42 | 414 | | |
| Net change | | – 2421 | + 574 | + 1540 | – 35 | – 542 | + 414 | 23.7 | 63.6 |

FOOTNOTES FOR TABLE

\* % are based on Butene-1 net change, thus, in Run 3 there is an apparent yield of cis-butene-2 of 428.8, actually some trans-butene-2 or other monomer must also be undergoing isomerization to cis-butene-2.

\*\*Since the molecular sieve was preloaded with n-butane in runs 5 – 7 no point could be served in reporting n-butane in the feed and product streams, in any event n-butane appears to be essentially inert in the present reactions.

The invention claimed is:

1. A process for isomerizing butene-1 to butene-2 comprising contacting a feed containing butene-1 in liquid phase at a liquid hourly space velocity of from 5 to 15 with a catalyst consisting of a molecular sieve having an effective pore size of about 8 A., said molecular sieve having been activated prior to said contacting by heating at a temperature of at least 300°C., characterized in that said butene-2 is predominately in the cis form.

2. The process according to claim 1 wherein the activation is at a temperature in the range of 320° – 500°C.

3. The process according to claim 2 wherein the activation is carried out in a non-reactive gas of air, nitrogen, helium, argon or mixtures thereof.

4. The process according to claim 3 wherein the contacting is carried out at a temperature in the range of 50° to 150°C.

5. The process according to claim 4 wherein the pressure is sufficient to maintain the butene-1 in liquid phase.

6. The process according to claim 5 wherein the pressure is in the range of over 1 to 50 atmospheres.

7. The process according to claim 1 wherein the molecular sieve is type X.

8. The process according to claim 7 wherein the feed comprises 40 to 60 mole percent butene-1, 6 to 10 mole percent n-butane, 0 to 4 mole percent isobutylene and 30 to 50 mole percent butene-2.

9. The process according to claim 1 wherein the process is cyclic comprising alternating regenerating and contacting cycles, provided that the regenerating cycle is carried out at a temperature of at least 400°C. up to the temperature at which the molecular sieve is deactivated.

10. The process according to claim 9 wherein the regeneration temperature is in the range of 400° to 600°C.

* * * * *